Figures 1, 2:
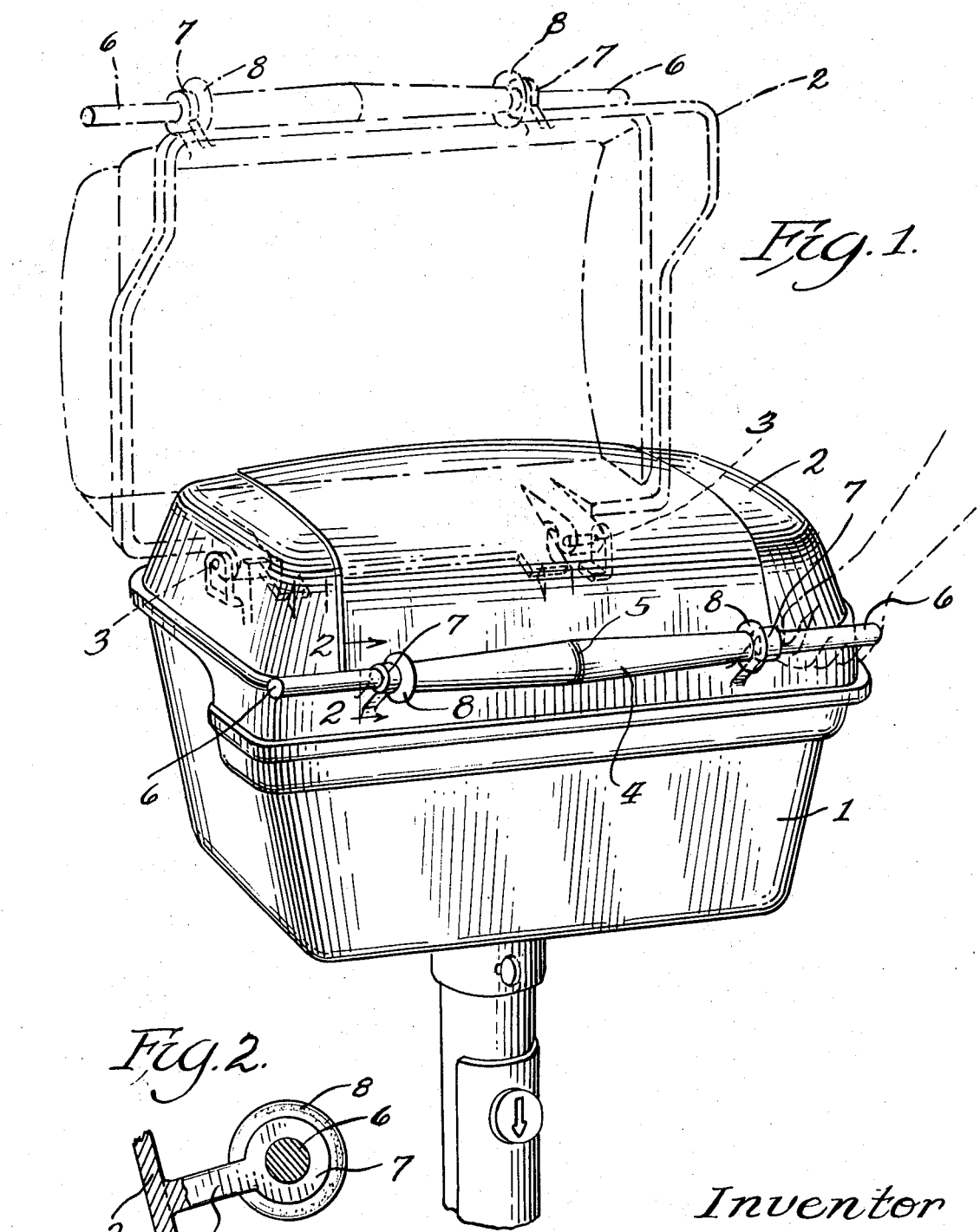

United States Patent

[11] 3,542,009

| [72] | Inventor | James T. Warner<br>Richardson, Texas |
|---|---|---|
| [21] | Appl. No. | 804,844 |
| [22] | Filed | March 6, 1969 |
| [45] | Patented | Nov. 24, 1970 |
| [73] | Assignee | Interlake Steel Corporation<br>Chicago, Illinois<br>a corporation of New York |

[54] COOKING-GRILL CONSTRUCTION
3 Claims, 2 Drawing Figs.

[52] U.S. Cl. .................................................. 126/25,
16/110
[51] Int. Cl. ..................................................... A47j 37/00,
A47j 45/08, F24b 3/00
[50] Field of Search .......................................... 126/25,
25A, 25B, 25C, 9, 190, 41; 16/110; 220/94

[56] References Cited
UNITED STATES PATENTS

| 1,796,033 | 3/1931 | Lee ................................. | 126/9 |
| 3,386,432 | 6/1968 | Hanson .......................... | 126/41 |
| 3,391,682 | 7/1968 | King et al. ..................... | 126/25 |

*Primary Examiner*—Charles J. Myhre
*Attorney*—William P. Porcelli

ABSTRACT: A cooking grill of the outdoor type for use with solid or gaseous fuel having an improved handle arrangement for the cover of the grill with a middle region to facilitate manual gripping of the handle from the middle front of the grill and two end regions extending to the opposite ends of the grill to facilitate manual gripping of the handle from the ends of the grill.

Patented Nov. 24, 1970 3,542,009

Inventor
James T. Warner
By William P. Porcelli
Atty.

COOKING-GRILL CONSTRUCTION

This invention relates to the art of cooking grills and particularly to improved construction of a handle means for an outdoor type barbecue grill employing either charcoal or gas as the fuel.

Generally, a cooking grill of the type mentioned has an open top receptacle housing a cooking grate on which the food is placed for cooking, a source of heat for heating the cooking grill and the food placed thereon. The receptacle is provided with a cover which ordinarily can be shifted between a position where it entirely covers the open top of the receptacle and a position where the open top is completely exposed. After food is positioned on the grill for cooking, the cover is moved to its closed position to keep the heat within the grill. A handle is mounted on the cover to facilitate manipulation of the cover between its two positions. However, the handle is usually mounted centrally at the front of the cover because this is most accessible to the cook or operator of the grill. However, the intense heat produced in the grill provides some problem when "flareup" or high flame occurs as a result of burning melted fat dripping from the food onto the hot portions of the grill.

In order to overcome this difficulty it is an object of the invention to provide a handle structure on such a grill which extends beyond the central region of the cover to both sides of it where it is easily accessible to a person standing alongside the grill. In this manner, a person so stationed can elevate the cover from either side of the grill and not be in direct confrontation with flame or concentrated heat emanating from the grill.

It is another object of the invention to provide such a handle which is rotatable on its axis so that as one portion of it is heated by the heat from the grill, it can be rotated to move the heated portion away from the grill for cooling.

Other objects and advantages of the invention can be better understood upon reference to the accompanying drawings in which:

FIG. 1 shows a three-quarters perspective view of an outdoor type grill embodying the invention; and FIG. 2 shows a sectional view along the line 2–2 of FIG. 1.

As shown in FIG. 1, the grill embodying the invention consists of a housing or receptacle 1 for containing the ordinary components of such a grill, viz., a cooking grate and a source of heat plus other ordinary items. The receptacle 1 has an open top which is closed by means of a cover 2 pivoted on hinges 3 at the rear of the receptacle 1 to allow the cover 2 to be moved between the closed position shown in solid outline and the position shown in phantom outline in FIG. 1.

The cover is provided with a handle 4 which is a spindle of larger diameter at its center region 5 and of smaller diameter at its ends 6. Adjacent to its ends 6 the handle is carried by two journals 7 which are of slightly larger inside diameter than the outside diameter of the handle ends 6. In this way, the handle is journaled loosely. On the side of the journals 7 adjacent the central portion 5 of the handle, the handle is provided with enlarged flanges 8 which keep the handle 4 from shifting longitudinally on its axis through the journal 7.

The central handle portion 5 permits the cook to grip the handle 4 at its mid regions 1, whereas, the handle ends 6 extend substantially to the side edges of the grill where they can be easily gripped by a person standing aside the unit. With the handle extending on both sides, it makes no difference whether the person is on one side or the other or centrally of the unit.

The journals 7 are mounted on arms 9 which are long enough to position the handle 4 a distance away from the cover 2 to insure that portions of the hand of the person do not come in contact with the cover 2 which may be relatively hot.

Although only substantially a single embodiment of the invention has been shown and described, it should be clearly understood that the invention can be made in many different ways without departing from the true scope of the invention as defined by the appended claims in which:

I claim:

1. A cooking grill, comprising a receptacle having an open top, a cooking grate supported in the receptacle above the level of the bottom of the receptacle, means for heating the cooking grate and food placed thereon, a cover removably disposed in a position to close the open top of the receptacle to confine heat within the receptacle, a handle mounted on the cover in supports which support the handle between its middle and end regions, said supports extending sufficiently from the cover to provide adequate space between the cover and the handle to permit manual gripping of the handle at its middle and end regions, said end regions extending substantially to locations in alignment with the opposite ends of the grill whereby the cover can be elevated and lowered conveniently from the sides of the grill by manually gripping either end region of the handle, the cover also capable of being elevated from the middle front of the grill by manual gripping of the handle at its middle region, the supports being provided with oversize openings in which the handle is journaled to thereby permit free axial rotation of the handle to allow different portions of the handle to be positioned away from the heat of the grill.

2. A cooking grill, comprising a receptacle having an open top, a cooking grate supported in the receptacle above the level of the bottom of the receptacle, means for heating the cooking grate and food placed thereon, a cover removably disposed in a position to close the open top of the receptacle to confine heat within the receptacle, a handle mounted on the cover in supports which support the handle between its middle and end regions, said supports extending sufficiently from the cover to provide adequate space between the cover and the handle to permit manual gripping of the handle at its middle and end regions, said end regions extending substantially to locations in alignment with the opposite ends of the grill whereby the cover can be elevated and lowered conveniently from the sides of the grill by manually gripping either end region of the handle, the cover also capable of being elevated from the middle front of the grill by manual gripping of the handle at its middle region, the handle being provided with collars adjacent the positions of the supports for limiting axial movement of the handle relative to the supports.

3. A cooking grill comprising, a receptacle having an open top, a cooking grate supported in the receptacle above the level of the bottom of the receptacle, means for heating the cooking grate and food placed thereon, a cover removably disposed in a position to close the open top of the receptacle to confine heat within the receptacle, a handle mounted on the cover in supports which support the handle between its middle and end regions, said supports extending sufficiently from the cover to provide adequate space between the cover and the handle to permit manual gripping of the handle at its middle and end regions, said end regions extending substantially to locations in alignment with the opposite ends of the grill whereby the cover can be elevated and lowered conveniently from the sides of the grill by manually gripping either end region of the handle, the cover also capable of being elevated from the middle front of the grill by manual gripping of the handle at its middle region, the supports being provided with oversize openings in which the handle is journaled to thereby permit free axial rotation of the handle to allow different portions of the handle to be positioned away from the heat of the grill, the handle being provided with collars adjacent the positions of the supports for limiting axial movement of the handle relative to the supports, said cover being hinged at its rear to the receptacle to cause the opening of the grill to occur by elevating the cover through an arc of movement.